April 1, 1930.    P. M. BOURDON    1,753,041
GROMMET FOR PNEUMATIC TIRES
Filed July 25, 1928

Inventor
Pierre Marcel Bourdon
By Wilkinson & Giusta
Attorneys.

Patented Apr. 1, 1930

1,753,041

UNITED STATES PATENT OFFICE

PIERRE MARCEL BOURDON, OF PARIS, FRANCE, ASSIGNOR TO MICHELIN ET CIE., OF CLERMONT-FERRAND, FRANCE, A CORPORATION OF FRANCE

GROMMET FOR PNEUMATIC TIRES

Application filed July 25, 1928, Serial No. 295,220, and in France August 1, 1927.

Twisted grommets are already known composed of a core formed of one or more wires surrounded by a layer of wires twisted around said core.

The extremities of the wires forming the sheath of the grommet have usually been soldered, brazed or united in an analogous manner. Such means of fastening present several disadvantages among which may be cited the production of seams and irregularities in shape, to say nothing of the over thickness which the said brazing and soldering operations produce. In addition, a grommet constructed in such wise is absolutely inextensible.

According to the present invention, the extremities of the wires constituting the grommets are connected by means of a sleeve into which the two extremities of the wire are inserted. This method of securing presents considerable advantage over the existing methods of fixation.

The extremities of the wires being inserted in the sleeve without necessitating screwing or soldering are maintained in the said sleeve simply by reason of the fact that the wires subside at the moment they are inserted in the sleeve and afterward have a tendency to open along the radius of the grommet without having any tendency to contract toward the rear. The sleeve is adapted to freely and slidably receive the opposite ends of the wire and permit the free flexing of the wire in the expansion and contraction of the ring formed by the wire. In this manner a smooth sleeve perfectly maintains the wires in place without it being necessary to clamp said wires. It will thus be obvious that the grommet will become more elastic and that it may be slightly elongated by compressing the wires without jeopardizing the solidity of the fixation means at the extremities thereof.

In addition the facility of construction of the grommets according to the invention and the reduction of its net cost are considerable. Likewise seams and irregularities of shape are entirely eliminated.

The accompanying drawing, by way of example, illustrates two embodiments of my improved sleeve.

In the drawing—

Figure 1:
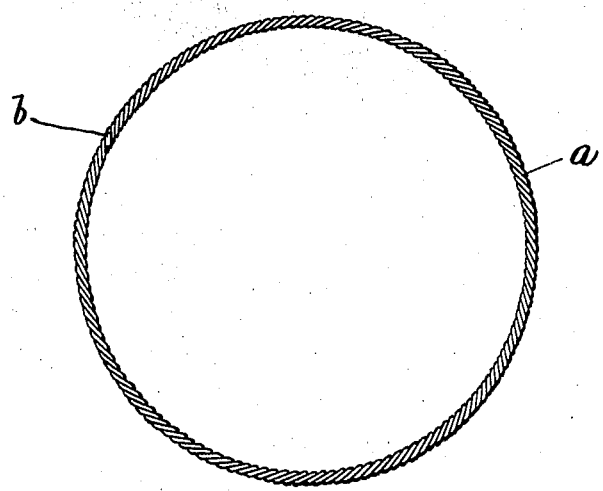
Fig. 1 is an elevational view of a grommet in which the extremities of the wire forming the sheath thereof are connected together by my improved sleeve.

Referring to the drawing, $a$ represents the grommet whose sheath is composed of a wire spirally wrapped about a core in a manner well known in the art. The extremities of said wire are connected by a sleeve $b$ into the opposite ends of which are inserted the extremities of the wire which are maintained therein due to the fact that the wire becomes compressed at the time of insertion into the sleeve and exerts, subsequently thereto, on the walls of the sleeve a pressure in the direction of the radius. The edges of sleeve $b$ are preferably rounded in order to facilitate introduction of the extremities of the wire.

Figure 2:
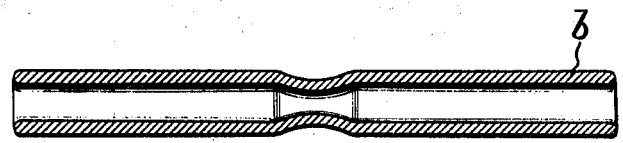
Fig. 2 is a sectional view of a sleeve having an orifice extending throughout its length.
Figure 3:
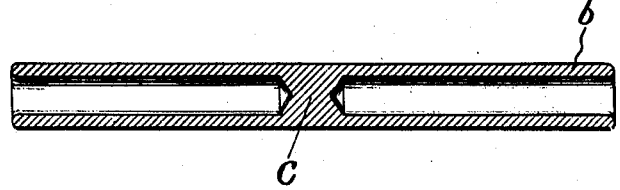
Fig. 3 is a sectional view of a modified form of sleeve provided with a central partition.

Fig. 2 shows a sleeve pierced from end to end and Fig. 3 shows a sleeve which is provided on the interior with a middle partition $c$, destined to prevent the sleeve from sliding completely off the ends of the wire.

It is to be understood that said partition can have any desired shape and may be readily replaced by a circular throat or other local deformation for preventing the wire from passing clear through.

It is to also be understood that the sleeve can be utilized for connecting the extremities of wires which constitute the sheath of the grommet, for connecting the extremities of the wires which constitute the core, as well as in the case where said core is constituted by circular wires disposed parallel as in the case where the core itself is constituted by spirally wound wires and for other purposes.

It will thus be understood from the above that the grommet may be made up of any desired number of wires and that the ends of each wire carry a sleeve which anchors the ends of the wire together so that the grommet may have a number of these small sleeves in its construction. Also, each wire may comprise a single strand or be composed of a number of strands suitably twisted or woven together.

The sleeves are preferably made of brass, mild steel or other metals. They are obtained by drawing, forging or rolling and analogous means.

While I have described what I deem to be the preferable form of my invention I do not wish to be limited thereto as there might be various changes made in the construction and arrangement of parts without departing from the spirit of the invention as comprehended within the scope of the appended claim.

Having described my invention what I claim as new and desire to secure by Letters Patent is—

A bead reinforcement for pneumatic tires having a circularly curved wire therein with its ends approaching each other, a connecting sleeve open at its opposite ends and adapted to freely and slidably receive the ends of the wire to permit of the free flexing of the wire in the expansion and contraction of the ring formed by the wire, said sleeve adapted to maintain the free ends of the wire in alignment during the relative movement of the ends of the wire.

In testimony whereof I have affixed my signature.

PIERRE MARCEL BOURDON.